(12) United States Patent
Wager et al.

(10) Patent No.: US 6,691,273 B2
(45) Date of Patent: Feb. 10, 2004

(54) ERROR CORRECTION USING PACKET COMBINING DURING SOFT HANDOVER

(75) Inventors: Stefan Wager, Helsingfors (FI); Erik Schön, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 398 days.

(21) Appl. No.: 09/764,506

(22) Filed: Jan. 17, 2001

(65) Prior Publication Data

US 2002/0095635 A1 Jul. 18, 2002

(51) Int. Cl.[7] .......................... H03M 13/00; H04L 1/00
(52) U.S. Cl. .............................. 714/751; 370/216
(58) Field of Search ........................ 714/748, 797, 714/807, 808, 751; 370/216, 241, 245, 260, 267, 268, 331, 332, 333

(56) References Cited

U.S. PATENT DOCUMENTS

| | | | |
|---|---|---|---|
| 5,734,646 A | | 3/1998 | I et al. ........................ 370/335 |
| 5,745,479 A | * | 4/1998 | Burns et al. ................. 370/245 |
| 5,936,937 A | * | 8/1999 | Fujita et al. ................. 370/216 |
| 5,968,197 A | * | 10/1999 | Doiron ........................ 714/748 |
| 5,978,365 A | | 11/1999 | Yi .............................. 370/331 |
| 5,983,382 A | | 11/1999 | Pauls ......................... 714/744 |
| 6,324,670 B1 | * | 11/2001 | Henriksen ................... 714/807 |
| 6,425,106 B1 | * | 7/2002 | Higginson et al. .......... 714/759 |

FOREIGN PATENT DOCUMENTS

| | | | |
|---|---|---|---|
| EP | 106465 | | 10/2000 |
| WO | WO 93/06671 | * | 4/1993 ............ H04L/1/18 |

* cited by examiner

*Primary Examiner*—Albert Decady
*Assistant Examiner*—Matthew C. Dooley

(57) ABSTRACT

A method of error correction during a soft handover process is disclosed wherein a radio network control node receives a plurality of versions of the same data block. Two or more of the received versions of the data block are combined to determine a substantially error corrected version of the data block. The resulting substantially error corrected version of the data block may then be forwarded to to other network nodes.

6 Claims, 3 Drawing Sheets

ERROR CORRECTION USING PACKET COMBINING DURING SOFT HANDOVER

BACKGROUND OF THE INVENTION

1. Technical Field of the Invention

The present invention relates to error correction methods, and more particularly, to a method for error correction using packet combining techniques during a soft handover process.

2. Description of Related Art

Digital cellular mobile systems normally apply a combination of forward and backward error correction techniques to improve the bit error rate of radio channel transmissions over the air interface. Forward error correction (FEC) involves a process of adding redundant information within transmitted bit streams at the transmitter that is used by the receiver to correct transmission errors.

The automatic repeat request (ARQ) technique is a form of backward error correction wherein the receiver requests the retransmission of packet data units (PDUs) that are incorrectly received from the transmitter. Packet combining techniques have been used within communication link protocols supporting automatic repeat request (ARQ). Data packets are transmitted and received sequentially within ARQ protocols. Once a packet is determined to be corrupt by the receiver, a retransmit request is sent back to the transmitter, requesting a retransmission of the corrupt packet. If the retransmitted packet is again determined to be corrupt by the receiver, the second packet may be combined with a stored version of the previously transmitted packet to correct any transmission errors. This technique is known as Type II Hybrid ARQ.

The problem with these techniques and others presently utilized for error correction is the necessity of including additional overhead (information) on the radio air interface in order to correct the transmitted information. For example, the FEC techniques require the addition of redundant bit information within the transmitted bit stream, and the ARQ techniques involve the transmission of additional messages requesting the retransmission of previously transmitted information. Thus, each of these techniques utilize additional bandwidth which may be at a premium in certain systems. Thus, a need has arisen for an improved error correction scheme that does not require the utilization of additional overhead within the radio air interface or a scheme which may be used to improve existing FEC and ARQ techniques.

SUMMARY OF THE INVENTION

The present invention overcomes the foregoing and other problems with a method of error correction during a soft handover process wherein a plurality of versions of a single data block are received at a radio network control node. At least two of the received versions of the data block are combined to create a substantially error corrected version of the data block for output to an attached MSC or other network node.

In a first embodiment, a first version and a second version from the received plurality of versions of the data block are exclusive or-ed together to determine bit positions within the data block where potentially erroneous bits are present. Each bit combination for the bits in the plurality of erroneous bit positions are determined, and the combination of bit values determined to be a substantially error corrected version of the data block selected based upon an error detection determination for each combination of bit values.

In a second embodiment, the plurality of versions of the data block are compared to determine which bit value occurs most frequently in each bit position of the data block. The bit values occurring a majority of the time for each bit position are selected, and the selected bit values are used to generate the substantially error corrected version of the data block.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
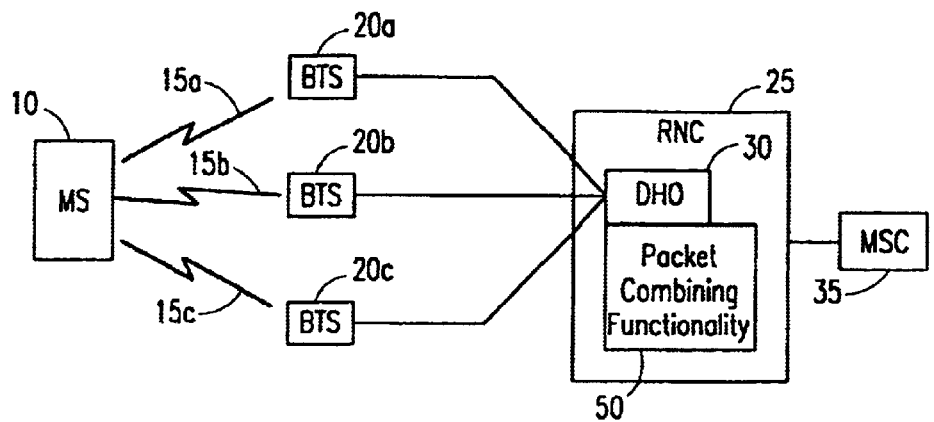
FIG. 1 is a block diagram of the components involved in a soft handover within a CDMA cellular system.

Referring now to the drawings, and more particular to FIG. 1, there is illustrated a CDMA system using soft handover in which the soft handover packet combining technique of the present invention may be implemented. Soft handover involves a situation where a mobile station 10 communicating with a first base transceiver station 20a is handed off from the first base transceiver station 20a to another base transceiver station 20b, 20c. During the soft handover process, rather than immediately ending a first radio air interface 15a between the mobile station 10 and the base transceiver station 20a upon the creation of a second radio air interface, 15b or 15c, the first air interface 15a is maintained with the presently connected base transceiver station 20a along with the air interface 15b, 15c of a new base transceiver station 20b, 20c.

Figure 2:
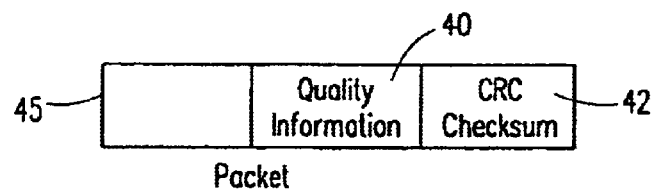
FIG. 2 illustrates a packet data unit (PDU) having quality information appended thereto.

The base transceiver stations 20 having air interfaces 15 with the mobile station 10 are interconnected with a radio network control node (RNC) 25 which controls the air interface connections 15 between the mobile station 10 and the base transceiver stations 20. The RNC 25 includes a diversity handover unit 30 (DHO) for performing diversity combining techniques on the multiple data streams received from the base transceiver stations 20. The diversity handover unit 30 compares multiple versions of a data packet 45 received from the base transceiver stations and selects the data packet (frame) having the best quality based upon quality information 40 attached to each packet at the base transceiver station 20. The quality information 40 is attached to a data packet 45, as is generally illustrated in FIG. 2, at the base transceiver station 20. The quality information 40 may comprise an indication of interference level within the received data packet 45 or a cyclic redundancy check (CRC) test result. The data packet 45 will also include a CRC checksum 42, which is used to determine the correctness of the packet. It should be realized that the order of the fields illustrated in the packet 45 is exemplary only and any order may be used. The selected data packet 45 is forwarded on to the mobile switching center (MSC) 35. In alternative situations, for example, WCDMA, the selected data packet 45 may be further processed by higher protocol layers in the RNC before delivery to other nodes.

Figure 4:
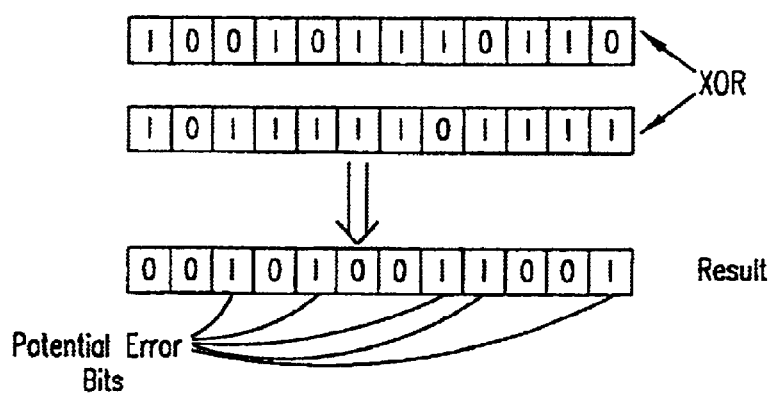
FIG. 4 is an example of the process described in FIG. 3.

The present invention includes packet combining functionality logic 50 within the diversity handover unit 30 that utilizes packet combining techniques on the received data frames to carry out improved error correction. Several versions of a same data packet 45 are received in parallel at the DHO 30 from the base transceiver stations 20 during a soft handover process. The versions may be the same or different depending on errors introduced during the transmission process. The diversity handover unit 30 determines if all CRC checksum calculations have failed for each of the received data packets, and if so, uses a defined process to combine two or more of the received data packets to provide a data packet having all bit information in the correct form. This process may utilize any of a number of procedures, two embodiments of which are described in detail below with respect to FIGS. 3 and 4.

Figure 3:
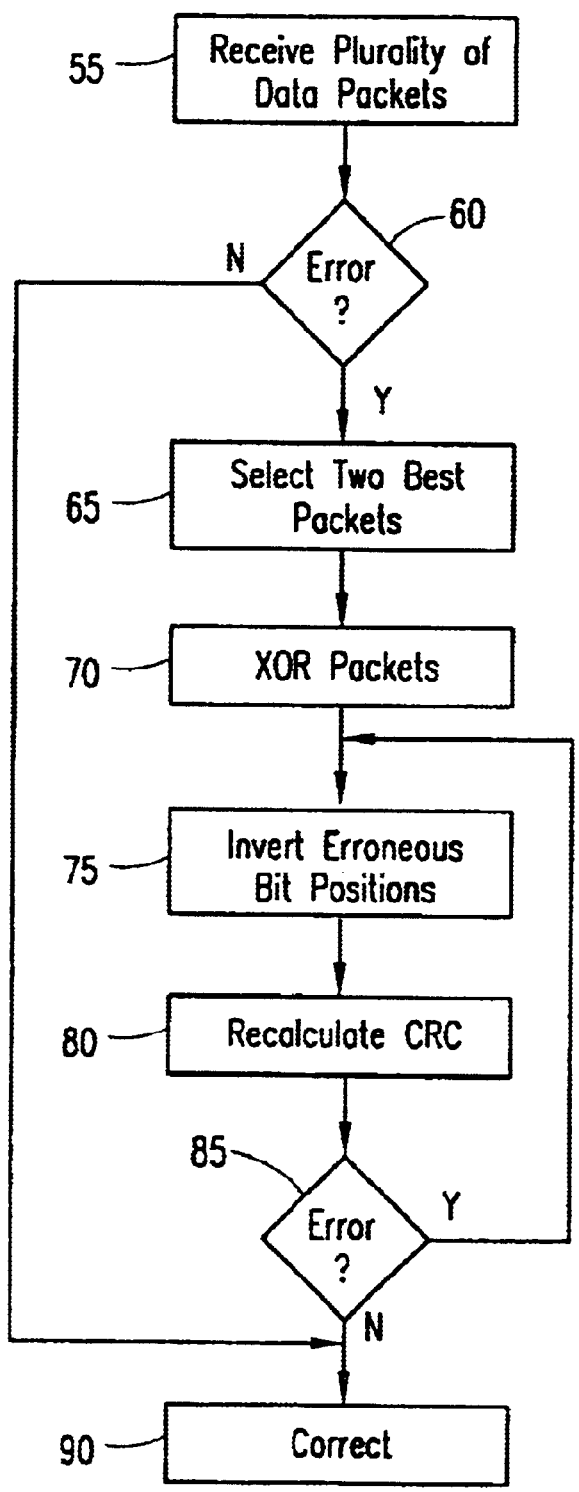
FIG. 3 is a flow diagram illustrating a first embodiment of the packet combining error technique of the present invention.

Referring now to FIG. 3, there is illustrated a flow diagram describing a first embodiment of the process which may be performed by the packet combining functionality logic 50 for correcting errors within received signals during a soft handover using packet combining techniques. This functionality is located after the channel decoding processes have been performed. Initially, a plurality of data packets 45 are received at step 55 at the diversity unit from the plurality of base transceiver stations 20. The versions may be the same or different depending on errors introduced during the transmission process. However, all packets are encoded in the same manner. The diversity handover unit 30 first makes a comparison at inquiry step 60 of all of the quality information 40 appended to the plurality of data packets 45 to determine if any data packet is error free based on the attached quality information 40. If a packet is indicated as being error free at inquiry step 60, the error free packet is forwarded at step 90 to the MSC 35. If none of the received data packets 45 are error free, the diversity handover unit 30 selects at step 65 the two best data packets 45 based upon the appended quality information 40. The corresponding bit positions of each of the selected data packets 45 are exclusive or-ed together at step 70 to determine bit positions which are not identical (these positions will be indicated by a value "one") and thus contain potential errors. This process is graphically illustrated in FIG. 4.

Figure 5:
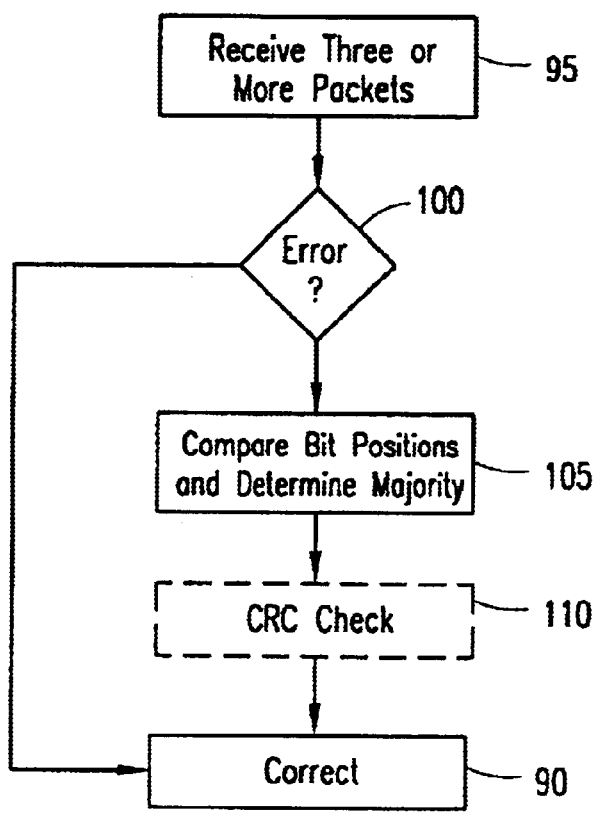
FIG. 5 is a flow diagram illustrating an alternative embodiment of the packet combining error technique of the present invention.
Figure 6:
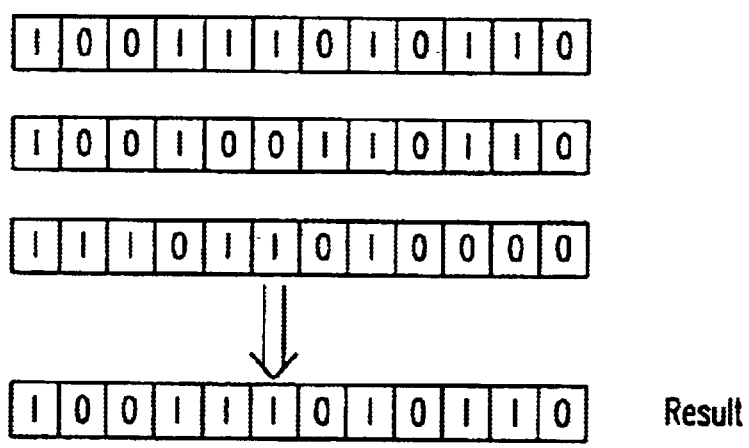
FIG. 6 is an example of the process described in FIG. 5.

The process illustrated in steps 75 through 80 successively inverts the indicated erroneous bits to all possible combinations to determine the correct bit information for the data packet 45. This process involves establishing a first combination of bits at step 75, recalculating the CRC for the data packet 45 based upon the changed bit position or positions, and determining at inquiry step 85 whether the data packet contains errors. If the data packet 45 contains errors, control passes back to step 75 and a next combination of bits is processed. Once the correct combination of bits is found (i.e., substantially error free), the correct packet 45 is identified and forwarded at step 90 to the mobile switching center 35. In alternative situations, for example, WCDMA, the selected data packet 45 may be further processed by higher protocol layers in the RNC before delivery to other nodes. The process of FIG. 4 may be interrupted at any time as the maximum process of time is reached. When this occurs, no correct version is found and a packet having the best quality information is forwarded. The reason for this limitation is that the number of CRC calculations increases exponentially with the number of erroneous bit positions. It may be necessary to set an upper limit to the number of bit inversions and CRC calculations that can be performed without heeding the delay requirements for a packet An alternative embodiment of the process performed by the packet combining functionality logic 50 is illustrated in FIG. 5. In this embodiment, three or more versions of a same data packet 45 are received at step 95 by the diversity handover unit 30 from a number of base transceiver stations 20. Inquiry step 100 determines if an error-free data packet was provided by any of the base transceiver stations 20 by examining the quality information 40 attached to the data packets 45. If so, the error-free data packet 45 is identified at step 115 and forwarded to the MSC 35. If no error-free packets 45 are detected, each bit position of the received data packets are compared to each other at step 105, and the majority bit value determined and selected for each bit position. Thus, if three data packets were received and within the first bit position two of the packets 45 indicated a value of "one" and one of the packets indicated a value of "zero", the value of "one" would be selected for the first bit position. This process is repeated for each subsequent bit position of the data packet 45 until a new substantially error free packet is generated. This process is graphically illustrated in FIG. 6. Once a new data packet 45 is determined in this manner, a CRC calculation may be made at step 110 if this functionality is available at the RNC node 25 to check the new packet for errors. However, this step is optional. Once the majority determinations have been completed, the corrected data packet is selected and forwarded to the mobile switching center 35 at step 115.

Utilizing the above described packet combining functionality method and apparatus, an error correction technique utilizing packet combining may be performed without requiring the addition of any overhead within the air interface between the base transceiver stations and the mobile station 10 within, for example, a CDMA system. This provides for more efficient utilization of the system resources and faster operation.

The previous description is of a preferred embodiment for implementing the invention, and the scope of the invention should not necessarily be limited by this description. The scope of the present invention is instead defined by the following claims.

What is claimed is:

1. A method of error correction during a soft handover process, comprising the steps of:

receiving at least two versions of a data block;

determining whether any of the received versions are error-free;

if a received version is error-free, outputting the error-free version of the data block;

if none of the received versions are error-free, selecting the best two versions according to guality information appended to each version;

performing an exclusive OR operation on a first version of the data block and a second version of the data block to identify potentially erroneous bit positions in the data block, said potentially erroneous bit positions having bit values that are not identical in the first and second versions of the data block;

successively inverting the bit values for the potentially erroneous bit positions in the data block to form all possible resulting combinations of bit values;

after each successive inverting of a bit value, performing an error detection determination for the resulting combination of bit values;

if the error detection determination indicates an error for the resulting combination of bit values, performing the error detection determination for a successive combination of bit values;

if the error detection determination indicates that the resulting combination of bit values is error-free, selecting the resulting combination of bit values as a substantially error corrected version of the data block; and outputting the substantially error corrected version of the data block.

2. The method of claim 1, wherein the step of performing an error detecting determination comprises performing a cyclic redundancy check for each combination of bit values.

3. The method of claim 1, further comprising the steps of:

determining whether a predefined time period expires before an error-free combination of bit values is found; and outputting the version of the data block having the best appended quality information if the predefined time period expires before an error-free combination of bit values is found.

4. A radio network control node, comprising:

input means for receiving at least two versions of a data block;

error detecting means for determining whether any of the received versions are error-free;

output means for outputting an error-free version of the data block;

packet combining logic responsive to a determination that none of the received versions are error-free, said packet combining logic being operable:

to select the best two versions of the data block according to quality information appended to each version;

to perform an exclusive OR operation on a first version and a second version of the data block to identify potentially erroneous bit positions in which bit values in the first and second versions of the data block are not identical;

to successively invert the bit values for the potentially erroneous bit positions in the data block to form all possible resulting combinations of bit values;

to perform an error detection determination for the resulting combination of bit values after each successive inverting of a bit value;

to perform the error detection determination for a successive combination of bit values if the error detection determination indicates an error for the resulting combination of bit values; and to select the resulting combination of bit values as a substantially error corrected version of the data block if the error detection determination indicates that the resulting combination of bit values is error-free;

wherein, the output means is adapted to output the substantially error corrected version of the data block as determined by the packet combining logic.

5. The radio network control node of claim 4, wherein the error detection determination performed by the packet combining logic is a cyclic redundancy check that the packet combining logic performs for each combination of bit values.

6. The radio network control node of claim 4, wherein the packet combining logic is also operable to determine whether a predefined time period expires before an error-free combination of bit values is found, and the output means is also adapted to output the version of the data block having the best appended quality information if the packet combining logic indicates that the predefined time period expired before an error-free combination of bit values was found.

* * * * *